(12) United States Patent
Peyton et al.

(10) Patent No.: US 11,970,414 B2
(45) Date of Patent: Apr. 30, 2024

(54) WATER SYSTEM COMPONENT

(71) Applicant: Hamilton Sundstrand Corporation, Charlotte, NC (US)

(72) Inventors: Barbara M. Peyton, Windsor, CT (US); Carol L. Metselaar, Vernon, CT (US); John W. Steele, New Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 56 days.

(21) Appl. No.: 16/922,418

(22) Filed: Jul. 7, 2020

(65) Prior Publication Data

US 2022/0009806 A1 Jan. 13, 2022

(51) Int. Cl.
*A01N 59/16* (2006.01)
*A01N 59/20* (2006.01)
*C02F 1/50* (2023.01)

(52) U.S. Cl.
CPC .............. *C02F 1/505* (2013.01); *A01N 59/16* (2013.01); *A01N 59/20* (2013.01); *C02F 2303/04* (2013.01)

(58) Field of Classification Search
CPC ..... A01N 59/16; A01N 59/00; F28F 2245/02; C02F 2303/04
See application file for complete search history.

(56) References Cited

U.S. PATENT DOCUMENTS

| | | | |
|---|---|---|---|
| 5,264,250 A | 11/1993 | Steele et al. | |
| 5,305,827 A | 4/1994 | Steele et al. | |
| 5,503,840 A | 4/1996 | Jacobson | |
| 5,562,949 A | 10/1996 | Steele et al. | |
| 6,170,564 B1 | 1/2001 | Steele | |
| 6,630,106 B1 | 10/2003 | Levy | |
| 7,008,979 B2 | 3/2006 | Schottman et al. | |
| 2004/0101572 A1* | 5/2004 | Kepner | A01N 59/16 424/617 |
| 2007/0000407 A1 | 1/2007 | Leong | |
| 2010/0062032 A1 | 3/2010 | Sharma | |
| 2015/0048272 A1* | 2/2015 | Rai | B02C 23/36 252/75 |
| 2015/0168085 A1* | 6/2015 | Wagner | F28F 21/04 165/133 |
| 2018/0244930 A1 | 8/2018 | Steele et al. | |
| 2018/0340081 A1 | 11/2018 | Steele | |
| 2019/0364886 A1 | 12/2019 | Steele et al. | |
| 2021/0214562 A1 | 7/2021 | Peyton et al. | |

FOREIGN PATENT DOCUMENTS

| | | | | |
|---|---|---|---|---|
| CN | 108485441 A | | 9/2018 | |
| JP | H09511534 A | * | 11/1997 | |
| JP | 2001280879 A | * | 10/2001 | ................ F24F 8/22 |
| WO | 2019246025 A1 | | 12/2019 | |

OTHER PUBLICATIONS

Krishna et al., Nature: Scientific Reports, 2018, 8, 1894, 1-11.*
Titanium oxide literature, 33 pages downloaded on Sep. 1, 2021 from https://pubchem.ncbi.nlm.nih.gov/compound/Titanium-Oxide Year: 2021).
Extended European Search Report for EP Application No. 21184337.0 dated Nov. 5, 2021, pp. 1-7.
European Office Action for EP Application No. 21184337.0, dated Jun. 19, 2023, pp. 1-6.
U.S. Non-Final Office Action issued in U.S. Appl. No. 16/742,666 on Feb. 16, 2022, 18 pages.
U.S. Non-Final Office Action issued in U.S. Appl. No. 16/742,666 on Sep. 7, 2021, 19 pages.

* cited by examiner

*Primary Examiner* — Kyle A Purdy
(74) *Attorney, Agent, or Firm* — CANTOR COLBURN LLP

(57) ABSTRACT

Disclosed herein is a water system component including a substrate and a hydrophilic coating disposed on the substrate. The hydrophilic coating includes an adhesive agent; an insolubilizer for insolubilizing the adhesive agent; titanium dioxide; and a metal oxide selected from the group consisting of silver oxide, copper oxide, iron oxide, magnesium oxide, and combinations thereof.

13 Claims, No Drawings

WATER SYSTEM COMPONENT

BACKGROUND

Exemplary embodiments pertain to the art of water systems and anti-microbial water system treatment.

Water treatment systems can become contaminated with bacteria, fungus and the like. Metal ions such as silver ions can control microbial growth but current systems for introducing metal ions to a water system are complicated and require a power source. Simpler, reliable systems are desired.

BRIEF DESCRIPTION

Disclosed herein is a water system component. The water system component includes a substrate and a hydrophilic coating disposed on the substrate. The hydrophilic coating includes an adhesive agent; an insolubilizer for insolubilizing the adhesive agent; titanium dioxide; and a metal oxide selected from the group consisting of silver oxide, copper oxide, iron oxide, magnesium oxide, and combinations thereof.

In addition to one or more of the features described above, or as an alternative to any of the foregoing embodiments, the metal oxide is selected from the group consisting of silver oxide, copper oxide and combinations thereof.

In addition to one or more of the features described above, or as an alternative to any of the foregoing embodiments, the metal oxide is silver oxide.

In addition to one or more of the features described above, or as an alternative to any of the foregoing embodiments, the adhesive agent includes potassium silicate and the insolubilizer includes zinc oxide.

In addition to one or more of the features described above, or as an alternative to any of the foregoing embodiments, the titanium oxide is present in an amount of 10 to 25 percent by weight, based on the total weight of the hydrophilic coating.

In addition to one or more of the features described above, or as an alternative to any of the foregoing embodiments, the substrate includes a metal alloy sheet material, microporous metal silicate, metal alloy foam, zeolite, or a combination thereof.

In addition to one or more of the features described above, or as an alternative to any of the foregoing embodiments, the metal alloy comprises one or more of iron, chromium, nickel, copper and zinc.

In addition to one or more of the features described above, or as an alternative to any of the foregoing embodiments, the coating has a surface coverage of 5 to 30 milligrams per square inch.

Also disclosed is a method for treating water. The method includes contacting water with the water system component. The method may include contacting water with the water system component at a flow rate wherein the water system component has a sufficient coated surface area to result in a metal ion concentration greater than 50 parts per billion at the flow rate.

DETAILED DESCRIPTION

The water system component comprises a substrate and a hydrophilic coating disposed on the substrate. Exemplary substrates include high surface area materials that can be coated such as metal alloy sheet materials, microporous metal silicates, metal alloy foams, zeolites, and combinations thereof. Exemplary metal alloys include one or more of iron, chromium, nickel, copper and zinc.

The hydrophilic coating includes an adhesive agent; an insolubilizer for insolubilizing the adhesive agent; titanium dioxide; and a metal oxide selected from the group consisting of silver oxide, copper oxide, iron oxide, magnesium oxide, and combinations thereof. In some embodiments the metal oxide includes silver oxide, copper oxide or a combination thereof. In some embodiments the metal oxide is silver oxide. The metal oxide provides the metal ions for treating water.

The titanium dioxide increases the surface energy of the substrate and thereby provides the hydrophilic characteristics of the coating. In particular, the titanium dioxide provides a very high surface energy or polarity to the coating, inducing an "attraction" for anions such as hydroxyl ions. As a result, this polar surface causes a low interfacial energy between water and the substrate, thereby effecting the desired wetting which facilitates transfer of the metal ions to the water. After the surface of the substrate is wetted, the water thereon wicks into the inherently porous coating through capillary action. The water drawn into the pores of the coating draws other water molecules into the coating through inter-molecular attraction.

Using titanium dioxide results in several advantages. The hydrophilic coating using titanium dioxide has better adhesion than silicon dioxide coatings. This is shown by the fact that static dissolution tests show no detectable titanium dioxide in the water. This greatly increases the life span of the coating. Titanium dioxide based hydrophilic coatings also show increased resistance to hydrophobic contaminants, particularly octanoic acid and diethyl phthalate. Silicon dioxide based coatings can become hydrophobic after exposure to these contaminants. Titanium dioxide based hydrophilic coatings show improved adhesion properties by an order of magnitude compared to silicon dioxide based hydrophilic coatings. When tested by according to ASTM D3359-17 the silicon dioxide based coating shows a mass loss of 1%-2%. The titanium oxide based coating shows a mass loss of 0.1%. Improved adhesion prolongs the life of the coating.

The titanium dioxide is present in an amount of 8 to 20 by weight, based upon the total weight of the coating in the form of a coating slurry. A coating slurry is defined as including an adhesive agent; an insolubilizer for insolubilizing the adhesive agent; titanium dioxide; silver oxide and water or a water-based solvent. In some embodiments the concentration of titanium dioxide is 10% to 15% by weight or, 11% to 13% by weight, based upon the total weight of the slurry. The titanium dioxide content in the cured coating may be 10 to 25% by weight.

The titanium dioxide may have an average particle size of 6 to about 14 microns, or, 8 to 10 microns. Particle sizes within these ranges increase slurry life, decrease separation of the components of the slurry, and simplify mixing of the slurry.

The adhesive agent may be potassium silicate, lead borosilicate, or a combination thereof. One such adhesive agent is Kasil® #1, produced by Philadelphia Quartz Co., Philadelphia, Pa. Kasil® #1 contains 20.8% by weight silica, 8.3% by weight potassium oxide, balance water. The adhesive agent may be present in an amount of 10% to 30% by weight or, 15% to about 25% by weight, based upon the total weight of the slurry.

During preparation of the coating, the adhesive agent is generally in the form of a water soluble material. As a result, coating preparation requires conversion of the adhesive agent from a water soluble material to a water insoluble material with an insolubilizer which does not adversely affect the coating. The insolubilizer may have an average particle size of 6 to 14 microns, or, 8 to 10 microns.

Exemplary insolubilizers include silicofluorides ($SiF_6$) of sodium, potassium, barium, manganese, and mixtures thereof, and inorganic oxides such as zinc oxide, among others. One such inorganic oxide is Kadox® 15, 99% pure zinc oxide, produced by New Jersey Zinc Co., Ogdensborg, N.J. Particularly with the silicofluoride insolubilizers, sodium hydroxide can be used as a colloidal dispersant. The insolubilizer is present in an amount of 2 to about 8% by weight or, 3 to about 6% by weight, based upon the total weight of the slurry.

During preparation of the hydrophilic coating, the titanium dioxide is combined with the adhesive agent and the insolubilizer in a solvent that does not adversely affect the final coating, to form a slurry. This solvent is typically water or a water-based solvent. The solvent is present in an amount of 50% to 70% by weight, or 55% to 65% by weight, based upon the total weight of the slurry.

The hydrophilic coating further includes a metal oxide selected from the group consisting of silver oxide, copper oxide, iron oxide, magnesium oxide, and combinations thereof. The metal oxide provides biocidal characteristics to the coating. In order to prevent microbial proliferation, the metal oxide slowly dissolves into the condensate and inhibits microbial growth. It is thought that the metal ions from the metal oxide inhibit microbial growth by attacking the cellular deoxyribonucleic acid (DNA) of microorganisms.

The metal oxide is present in an amount of 2.0 to 10.0, or 2.0 to 5.0, or 2.0 to 3.0% by weight, based upon the total weight of the slurry. This amount of metal oxide is greater than previously thought possible. The combination of the titanium dioxide and the metal oxide allows for a greater content of metal oxide than was previously possible without a loss of adhesion. The higher level of metal oxide results in antifungal properties as well. This is in marked contrast to coatings that use silica dioxide instead of titanium dioxide. In inhibition zone fungal testing the silica dioxide based coating has a small, poorly defined zone of inhibition whereas the titanium dioxide based coating had a large and well defined zone. The method of testing was ASTM G22.

As with the titanium dioxide and the insolubilizer, the metal oxide may have an average particle size of 6 to 14 microns, or, 8 to 10 microns. As stated above, particle sizes in this range increase the slurry life, components do not separate out as quickly, and the slurry is easier to mix.

The slurry components are mixed until essentially homogenous and then preferably utilized before the components aggregate or agglomerate and settle creating component rich and component devoid areas in the coating.

Application of the coating, in the form of a slurry, to the substrate can be accomplished in various manners, all of which are conventional. These conventional processes included dipping, spraying, and painting the heat transfer surfaces with the slurry, flowing the slurry through the condenser and allowing it to remain a sufficient period of time to coat the heat transfer surfaces, and other common coating techniques.

Once the coating has been applied it must be dried and cured. Ultimately, complete removal of the water or water-based solvent and complete curing of the coating is desired. Various manners of accomplishing water or water-based solvent removal and curing include the use of a vacuum, flowing dry air over the coating, and heating the coating to a temperature which will induce curing without sintering, or conventional water or water-based solvent removal and curing techniques. Since water evaporates at 100° C., if the temperature of the coating is rapidly raised to above about 110° C., the water will rapidly vaporize thereby causing cracks and flaking in the coating. As a result, it is preferred to slowly raise the temperature of the coating sequentially or very slowly over a period of about 1 to about 6 hours.

One possible curing sequence includes heating the coating to 175 to 185° C. for 20 to 40 minutes, raising the temperature to 190 to 210° C. for 60 minutes, then increasing the temperature to 215 to 225° C. for 30 minutes, then increasing the temperature to 245 to 255° C., then increasing the temperature to 290 to 310° C. for 60 minutes, and finally maintaining the temperature at about 490 to 510° C. for 2 hours.

After during the coating may have a surface coverage of 5 to 30 milligrams per square inch.

Water is treated by contacting water with the water system component. The water system component can be in any form which allows for sufficient surface area contact to obtain the desired concentration of metal ions to inhibit microbial growth. For example, the water system component may be a fluid passageway, a cartridge, a baffle, or the like. For example, particulates such as zeolites or metal silicates can be coated and then placed in a cartridge which is then placed in contact with water. In another example, the substrate is a group of baffles which are placed in a cartridge in contact with the water. In another example the water system component is a pipe having the hydrophilic coating disposed on the interior of the pipe. The water can be flowing or non-flowing. In embodiments where the water is flowing the ratio of surface area to flow rate may be 0.01 to 0.05 milliliters/minute per square inch. The water, after contact with the water system component, may have a metal ion concentration greater than 50 parts per billion.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water system component comprising a substrate and a hydrophilic coating disposed on the substrate, wherein the hydrophilic coating comprises an adhesive agent; an insolubilizer; titanium dioxide; and silver oxide;

wherein the silver oxide is present in an amount of 5 to 10% by weight, based on the total weight of the hydrophilic coating in the form of a coating slurry;

wherein the titanium dioxide is present in an amount of 10 to 25 percent by weight, based on the total weight of the hydrophilic coating.

2. The water system component of claim 1, wherein the adhesive agent comprises potassium silicate and the insolubilizer comprises zinc oxide.

3. The water system component of claim 1, wherein the substrate comprises a metal alloy sheet material, microporous metal silicate, metal alloy foam, zeolite, or a combination thereof.

4. The water system component of claim 3, wherein the metal alloy comprises one or more of iron, chromium, nickel, copper and zinc.

5. The water system component of claim 1, wherein the coating has a surface coverage of 5 to 30 milligrams per square inch.

6. A method for treating water comprising contacting water with a water system component wherein the water system component comprises a substrate and a hydrophilic coating, wherein the hydrophilic coating comprises an adhesive agent; an insolubilizer; titanium dioxide; and silver oxide;

wherein the silver oxide is present in an amount of 5 to 10% by weight, based on the total weight of the hydrophilic coating in the form of a coating slurry;

wherein the titanium dioxide is present in an amount of 10 to 25 percent by weight, based on the total weight of the hydrophilic coating.

7. The method of claim 6, wherein after contacting the water system component the water has a metal ion concentration greater than 50 parts per billion.

8. The method of claim 6, wherein the adhesive agent comprises potassium silicate and the insolubilizer comprises zinc oxide.

9. The method of claim 6, wherein the titanium dioxide, insolubilizer and metal oxide have an average particle size of 6 to 14 microns.

10. The method of claim 6, wherein the substrate comprises a metal alloy sheet material, microporous metal silicate, metal alloy foam, zeolite, or a combination thereof.

11. The method of claim 10, wherein the metal alloy comprises one or more of iron, chromium, nickel, copper and zinc.

12. The method of claim 6, wherein the coating has a surface coverage of 5 to 30 milligrams per square inch.

13. The method of claim 6, wherein the hydrophilic coating is cured to the substrate by heating the coating to 175 to 185° C. for 20 to 40 minutes, raising the temperature to 190 to 210° C. for 60 minutes, then increasing the temperature to 215 to 225° C. for 30 minutes, then increasing the temperature to 245 to 255° C., then increasing the temperature to 290 to 310° C. for 60 minutes, and finally maintaining the temperature at about 490 to 510° C. for 2 hours.

* * * * *